(12) United States Patent
Rollinger et al.

(10) Patent No.: US 10,054,746 B2
(45) Date of Patent: Aug. 21, 2018

(54) ROTARY OPTICAL COMMUNICATION JOINT

(71) Applicant: RAYTHEON COMPANY, Waltham, MA (US)

(72) Inventors: Andrew R. Rollinger, Topanga, CA (US); Marcus A. Garraway, Hawthorne, CA (US); Gery Andrew Trup, Culver City, CA (US)

(73) Assignee: RAYTHEON COMPANY, Waltham, MA (US)

( * ) Notice: Subject to any disclaimer, the term of this patent is extended or adjusted under 35 U.S.C. 154(b) by 283 days.

(21) Appl. No.: 14/947,128

(22) Filed: Nov. 20, 2015

(65) Prior Publication Data
US 2018/0031771 A1   Feb. 1, 2018

(51) Int. Cl.
| | |
|---|---|
| *G02B 6/36* | (2006.01) |
| *H04B 10/114* | (2013.01) |
| *G02B 7/24* | (2006.01) |
| *G02B 6/32* | (2006.01) |
| *H04B 10/25* | (2013.01) |
| *G02B 6/26* | (2006.01) |
| *G02B 3/08* | (2006.01) |

(52) U.S. Cl.
CPC ............ *G02B 6/3604* (2013.01); *G02B 3/08* (2013.01); *G02B 6/262* (2013.01); *G02B 6/264* (2013.01); *G02B 6/32* (2013.01); *G02B 7/24* (2013.01); *H04B 10/1143* (2013.01); *H04B 10/2503* (2013.01)

(58) Field of Classification Search
CPC ..................................................... G02B 6/3604
See application file for complete search history.

(56) References Cited

U.S. PATENT DOCUMENTS

| | | | |
|---|---|---|---|
| 4,492,427 A | 1/1985 | Lewis et al. | |
| 4,753,506 A * | 6/1988 | Einhorn ................. | B64G 1/641 244/158.1 |
| 5,436,988 A * | 7/1995 | Narendran ........... | G02B 6/3604 385/12 |
| 5,633,963 A | 5/1997 | Rickenbach et al. | |
| 5,991,478 A | 11/1999 | Lewis et al. | |

(Continued)

FOREIGN PATENT DOCUMENTS

| | | |
|---|---|---|
| CN | 102667560 A | 9/2012 |
| WO | 2011068492 A1 | 6/2011 |

*Primary Examiner* — Nathan Cors
(74) *Attorney, Agent, or Firm* — Lando & Anastasi, LLP

(57) ABSTRACT

Systems for communication in a rotary joint. In one example, a communication system includes a stator, a rotor, a plurality of optical receivers circumferentially disposed at a first radius of one of the stator and the rotor, a plurality of optical transmitters circumferentially disposed at a second radius of the other of the stator and the rotor, each optical transmitter of the plurality configured to transmit a data signal to a corresponding optical receiver of the plurality of optical receivers, and a plurality of optical elements, individual optical elements having one of a first size and a second size, wherein individual optical elements are interposed between each optical transmitter of the plurality of optical transmitters and each optical receiver of the plurality of optical receivers and arranged so as to alternate between the first size and the second size along one of the first radius and the second radius.

19 Claims, 11 Drawing Sheets

(56) References Cited

U.S. PATENT DOCUMENTS

| | | | |
|---|---|---|---|
| 6,104,849 A | 8/2000 | Lewis et al. | |
| 7,792,400 B1 | 9/2010 | Zhang et al. | |
| 7,899,149 B2 | 3/2011 | Krumme et al. | |
| 8,355,607 B2 | 1/2013 | Zhang et al. | |
| 8,355,609 B2 | 1/2013 | Popp et al. | |
| 8,410,988 B2 | 4/2013 | Iverson et al. | |
| 8,414,303 B2 | 4/2013 | Nakamura et al. | |
| 9,122,017 B2 | 9/2015 | Cottrell | |
| 2004/0141686 A1* | 7/2004 | Schilling | A61B 6/56 385/26 |
| 2012/0237198 A1* | 9/2012 | Bowman | G02B 6/3604 398/1 |
| 2012/0280115 A1* | 11/2012 | Lo | G02B 7/24 250/216 |
| 2013/0243375 A1* | 9/2013 | Poisel | G02B 6/3604 385/26 |

\* cited by examiner

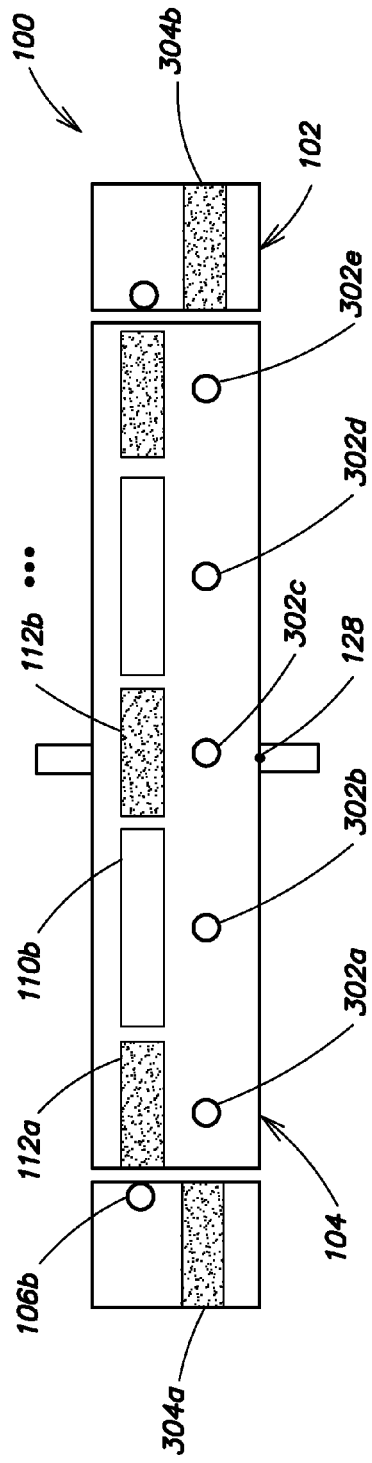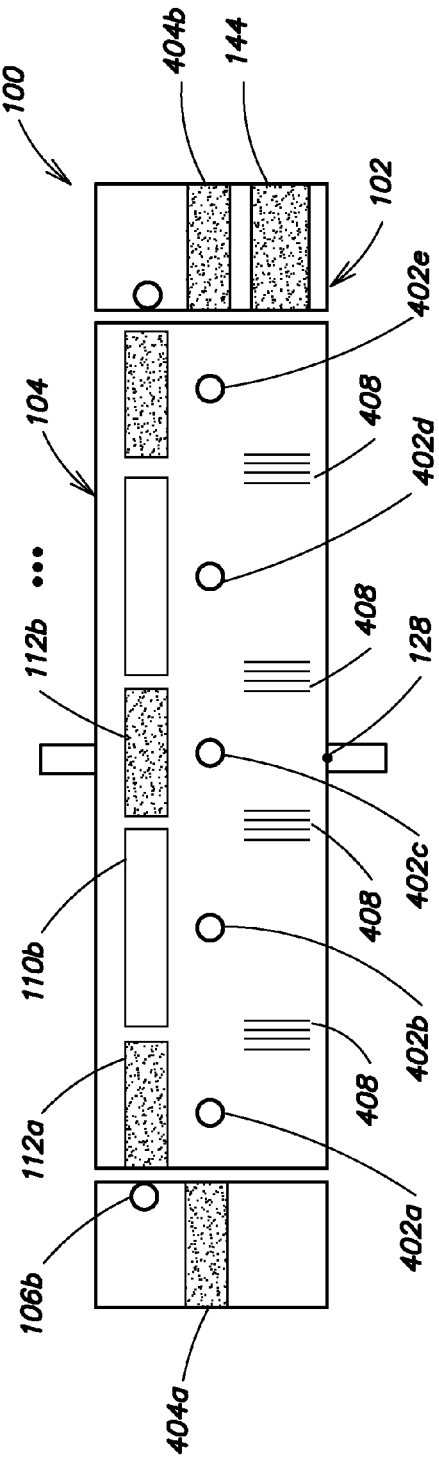

FIG. 7B

ROTARY OPTICAL COMMUNICATION JOINT

BACKGROUND

Fiber optic rotary joints have a wide variety of applications throughout scientific, industrial, and military fields. Fiber optic rotary joints allow transmission of a signal through objects that are rotatable relative to each other. Often, such devices have a rotor that is mounted for rotation about a stator. Signals are transmitted from the rotor to the stator, or the stator to the rotor, across an interface between the devices. Often transmission is between optical fibers located on the rotor and the stator. The optical fibers may pass through the interface between devices and wind/unwind during rotation, or alternatively, wirelessly communicate across the interface. Fiber optic rotary joints may be single channel or multi-channel and are commonly used in sensing systems, missile guidance systems, robotics systems, and other systems where high speed data transmission is required.

SUMMARY OF THE INVENTION

Aspects and embodiments are directed to a communication system. In particular, embodiments include a plurality of optical receivers positioned at a radius about one of a rotor and a stator, and a plurality of optical transmitters positioned at a radius about the other of the rotor and the stator. Interposed between the optical transmitters and the optical receivers is a plurality of optical elements, each element of the plurality having one of a first size or a second size. Individual optical elements of the plurality of elements are arranged alternating between the first size and the second size between optical transmitters and optical receivers so as the permit uninterrupted transmission between the plurality of optical transmitters and plurality of optical receivers during rotation of the rotor relative to the stator. In various aspects and embodiments, optical elements alternating in size between the first size and the second size ensures continuous data transmission without blackouts and data latency as the rotor rotates. Accordingly, transmitted data may be transmitted and received in parallel, and in further aspects and embodiments, may be encoded to a rotational speed of the rotor relative to the stator.

At least one aspect described herein is directed to a communication system. The communication system may include a stator, a rotor concentric to the stator, a first plurality of optical receivers circumferentially disposed at a first radius of one of the stator and the rotor, a first plurality of optical transmitters circumferentially disposed at a second radius of the other of the stator and the rotor, each optical transmitter of the first plurality configured to transmit a data signal to a corresponding optical receiver of the first plurality of optical receivers, and a first plurality of optical elements, individual optical elements of the first plurality having one of a first size and a second size, wherein individual optical elements are interposed between each optical transmitter of the first plurality of optical transmitters and each optical receiver of the first plurality of optical receivers and arranged so as to alternate between the first size and the second size along one of the first radius and the second radius.

According to one embodiment, the rotor is configured to concentrically rotate relative to the stator, and each optical receiver of the first plurality of optical receivers are configured to receive the data signals from each successively passing optical transmitter of the first plurality of optical transmitters. In a further embodiment, the first plurality of optical elements includes a first plurality of collimating optics. In a further embodiment, the plurality of collimating optics includes a plurality of catadioptric Frensel lenses. In one embodiment, collimating optics of the first plurality of collimating optics are positioned so as to overlap with an adjacently positioned collimating optic.

In one embodiment, the communication system may further include a second plurality of optical receivers circumferentially disposed at a third radius of one of the stator and the rotor, and a second plurality of optical transmitters circumferentially disposed at a fourth radius of the other of the stator and the rotor, each optical transmitter of the second plurality configured to transmit a data signal to a corresponding optical receiver of the second plurality of optical receivers. In a further embodiment, the communication system may further include a second plurality of optical elements, individual optical elements of the second plurality having one of the first size and the second size, wherein individual optical elements are interposed between each optical transmitter of the second plurality of optical transmitters and each optical receiver of the second plurality of optical receivers and arranged so as to alternate between the first size and the second size along one of the third radius and the fourth radius. In one embodiment, the first radius is a first radius of the rotor, the second radius is a second radius of the stator, the third radius is a third radius of the stator, and the fourth radius is a fourth radius of the rotor.

According to one embodiment, the communication system may further include a multiplexer decoder in communication with the first plurality of optical receivers and configured to multiplex the data signals from each optical receiver into a continuous stream. In one embodiment, the communication system may further include further a clock modulator configured to generate a data clock encoded to a rotational speed of the rotor, wherein the first plurality of optical transmitters are configured to transmit the data signals based on at least the data clock. According to one embodiment, the communication system may further include an optical encoder in communication with a transmit controller, wherein the optical encoder is positioned to detect rotational movement of the rotor and the transmit controller is configured to adjust a data transmission rate of the first plurality of optical transmitters based on the detected rotational movement. According to a further embodiment, the transmit controller is further configured to adjust a frame word length of the data signal transmitted by each optical transmitter of the first plurality of optical transmitters. In one embodiment, the communication system may further include a plurality of collimating lenses, individual lenses interposed between optical transmitters of the first plurality of optical transmitters and optical elements of the first plurality of optical elements.

According to another aspect, described herein is an optical system which may include a stator, a rotor concentric to the stator, a first plurality of optical receivers circumferentially disposed at a first radius of one of the stator and the rotor, a first plurality of optical transmitters circumferentially disposed at a second radius of the other of the stator and the rotor, each optical transmitter of the first plurality configured to transmit data to a corresponding optical receiver of the first plurality of optical receivers, and means for providing uninterrupted data transmission between optical transmitters of the first plurality of optical transmitters and optical receivers of the first plurality of optical receivers.

In one embodiment, communication system may further include a second plurality of optical receivers circumferentially disposed at a third radius of one of the stator and the rotor, and a second plurality of optical transmitters circumferentially disposed at a fourth radius of the other of the stator and the rotor, each optical transmitter of the second plurality configured to transmit data to a corresponding optical receiver of the second plurality of optical receivers. In a further embodiment, the communication system may further include means for providing uninterrupted data transmission between optical transmitters of the second plurality of optical transmitters and optical receivers of the second plurality of optical receivers.

According to an embodiment, the communication system may include a multiplexer decoder in communication with the first plurality of optical receivers and configured to multiplex the data signals from each optical receiver into a continuous stream. In one embodiment, the communication system may include a clock modulator configured to generate a data clock encoded to a rotational speed of the rotor, wherein the first plurality of optical transmitters are configured to transmit the data signals based on at least the data clock. According to an embodiment, the communication system may include an optical encoder in communication with a transmit controller, wherein the optical encoder is positioned to detect rotational movement of the rotor and the transmit controller is configured to adjust a data transmission rate of the first plurality of optical transmitters based on the detected rotational movement. In a further embodiment, the transmit controller is further configured to adjust a frame word length of the data signal transmitted by each optical transmitter of the first plurality of optical transmitters.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3 is a side view of the optical communication system shown in FIG. 1 according to an example;

FIG. 4 is an additional side view of the optical communication system shown in FIG. 1 according to an example;

FIGS. 7A and 7B are an illustration of data transmission timing according to an example;

DETAILED DESCRIPTION

Figure 1:
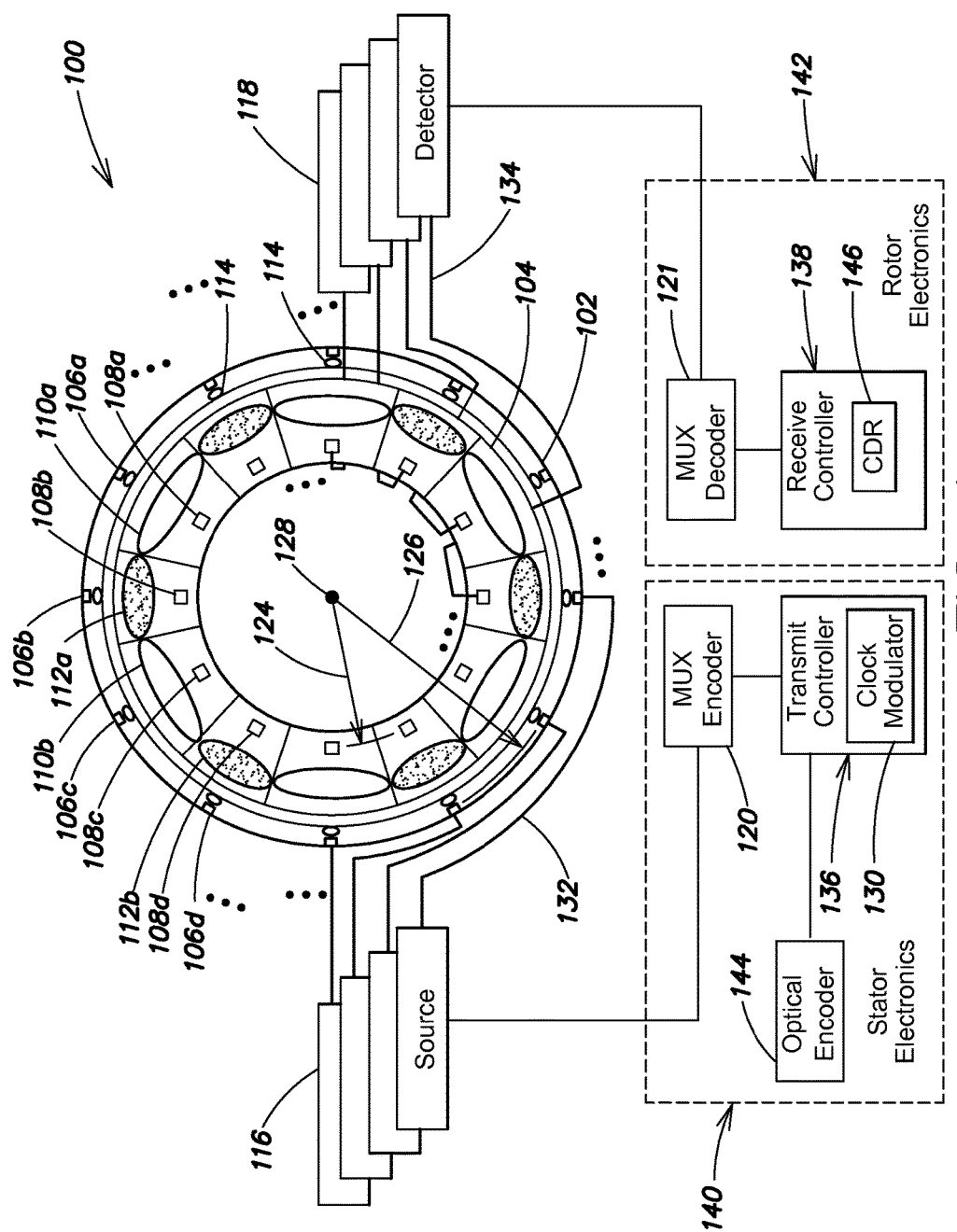
FIG. 1 is a schematic illustration of one example of an optical communication system according to at least one embodiment.

Aspects and embodiments are directed to communication systems and methods. In particular, one embodiment includes a communication system for high-speed uninterrupted optical communication through a rotary joint. As discussed in more detail below, the system includes a rotor positioned for rotational movement relative to a stator. As used herein, the stator may include any part that remains fixed with respect to a rotating part, and the rotor may include any rotating part. The system includes a plurality of optical receivers positioned on one of the rotor and the stator and a plurality of optical transmitters positioned on the other of the rotor and the stator. Individual ones of the plurality of optical transmitters are configured to transmit optical data signals to individual ones or groups of the plurality of optical receivers. Interposed between the optical transmitters and the optical receivers is a plurality of optical elements, each element of the plurality having one of a first size or a second size. Individual optical elements of the plurality of optical elements are arranged alternating in size between the optical transmitters and the optical receivers. Thus, optical transmission from each optical transmitter will pass through an optical element of the plurality of optical elements. During rotation of the rotor, the optical transmission from each optical transmitter will successively pass through optical elements of alternating size. Accordingly, as discussed in more detail below, aspects and embodiments permit uninterrupted data transmission with no blackouts or data latency.

The benefits of uninterrupted data transmission may thus be achieved without requiring numerous fibers aligned at an axis of rotation of the rotary joint, numerous wires coupled between the rotor and the stator, or ellipsoidal reflectors, as used in conventional implementations. Notably, fibers aligned at the axis of rotation restrict the rate of data transmission through the rotary joint based on the dimensional requirements of the rotary joint. While allowing larger data transmission rates, wired rotary joints restrict the number of rotations of the rotor as the fibers or wires must be un-wound after a certain number of rotations. Optical rotary joints including ellipsoidal reflectors also suffer notable deficiencies. Ellipsoidal reflectors are inherently sensitive to disturbances and require precise calibration, which can be impractical in many applications. Accordingly, various embodiments provide an improved system and method for uninterrupted data communication through the interface between objects that are rotatable relative to each other (e.g., a rotary joint).

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is provided an illustration of an optical communication system according to an example. According to certain aspects, the system 100 includes a stator 102, a rotor 104, a first plurality of optical transmitters (106a, 106b, 106c, . . . ), a first plurality of optical receivers (108a, 108b, 108c, . . . ), and a first plurality of optical elements each having one of a first size and a second size. Optical elements of the first size are indicated generally as 110a, 110b, and etc., and optical elements of the second size are indicated generally as 112a, 112b, and etc. In further embodiments, the system 100 may also include a plurality of collimating lenses 114, one or more light sources 116, one or more detectors 118, stator electronics 140, and rotor electronics 142. As shown, the stator electronics 140 and rotor electronics may include a multiplexer system (e.g., multiplexer encoder 120 and multiplexer decoder 121), an optical encoder 144, and one or more controllers (e.g., a transmit controller 136 and a receive controller 138). While FIG. 1 shows the stator electronics 140 including the transmit controller 136 and the rotor electronics 142 including the receive controller 138, in various other arrangements the transmit controller 136 and receive controller 138 may be included within the other of the rotor electronics 142 and the stator electronics 140. As discussed in further detail below, in various further embodiments the stator electronics 140 and the rotor electronics 142 may also each include a transmit controller and a receive controller. Such an arrangement may permit bi-directional communication.

Figure 11:
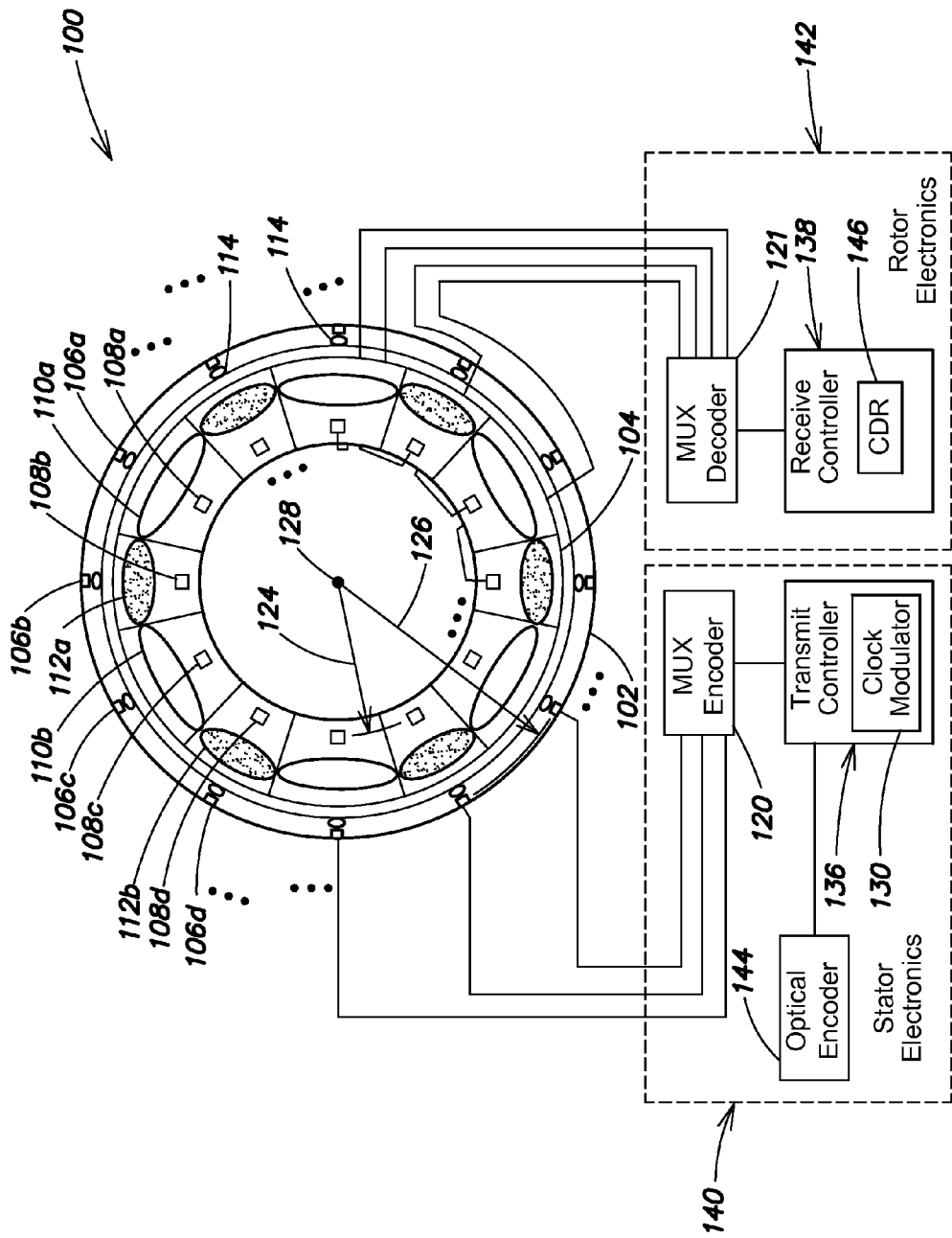
FIG. 11 is another schematic illustration of the example of the optical communication system shown in FIG. 1, according to at least one example.

Lines 132 demonstrate the connections between the light source(s) 116 and the first plurality of optical transmitters, and lines 134 demonstrate the connections between the detector(s) 118 and the first plurality of optical receivers. As described in further detail below, in one embodiment optical transmitters and optical receivers may include optical fiber ends. In other embodiments, and as shown in FIG. 11, optical transmitters and optical receivers may alternatively each include a light source (e.g., light source 116) or a detector (e.g., detector 118). Accordingly, in various embodiments optical transmitters may include any active or passive element adapted to deliver an optical data signal, and optical receivers may include any active or passive element adapted to collect an optical data signal.

In several embodiments, the rotor 104 is positioned concentric to the stator 102. The rotor 104 is rotatable through a full positive or negative 360 degree rotation (i.e., rotation in a clockwise or counter-clockwise direction). The first plurality of optical receivers are shown circumferentially disposed at a first radius 124 of the rotor 104, and the first plurality of optical transmitters are shown circumferentially disposed at a second radius 126 of the stator 102. In various embodiments, the system 100 includes a corresponding number of optical transmitters and optical receivers (i.e., a one to one ratio). Alternatively, the first plurality of optical transmitters may be circumferentially disposed at a radius of the rotor 104, and the first plurality of optical receivers may be circumferentially disposed at a radius of the stator 102. Accordingly, the first plurality of optical transmitters is shown circumferentially disposed at the second radius 126 of the stator 102, and the first plurality of optical transmitters is shown circumferentially disposed at the first radius 124 of the rotor 104 in FIG. 1 for purposes of explanation only. That is, optical receivers and optical transmitters may be positioned at either of the rotor 104 or the stator 102. As further shown in FIG. 1, each optical transmitter of the first plurality of optical transmitters may be spaced equidistance apart, and each optical receiver of the first plurality of optical receivers may be spaced equidistance apart.

The first radius 124 of the rotor 104 includes a distance from a rotation axis indicated by point 128, and may include any arbitrary distance. Similarly, the second radius 126 of the stator 102 includes a second distance from the rotation axis indicated by point 128, and may also include any arbitrary distance. Accordingly, the first plurality of optical transmitters may be circumferentially disposed at any position along a surface of the rotor 104 or stator 102, and the first plurality of optical transmitters may be circumferentially disposed at any position along the other of the rotor 104 or stator 102. This may include a top surface, a bottom surface, or a side surface, of the rotor 104 or stator 102.

In various embodiments, each optical transmitter of the first plurality of optical transmitters may be an optical fiber end. Use of optical fibers may improve the performance of the system 100 by separating temperature sensitive components from high temperature locations. In such embodiments, the first plurality of optical transmitters is coupled to and in optical communication with the light source(s) 116. In particular, each optical transmitter of the first plurality of optical transmitters may be coupled to an individual light source. Optical data signals are selectively generated by the light source(s) 116 and communicated via one or more optical fibers to individual optical fiber ends. The light source(s) 116 may include any optical source configured to emit an electromagnetic carrier wave modulated with information, such as a light-emitting diode (LED) or a laser diode (e.g., vertical-cavity surface-emitting laser). The light source(s) 116 are configured to generate optical data signals at one or more wavelengths and may be driven by one or more control signals from the transmit controller 136. Turning briefly to FIG. 11, which shows a further schematic illustration of the optical system 100 illustrated in FIG. 1, in other embodiments, each optical transmitter of the first plurality of optical transmitters may be an individual light source, such as one of the light source(s) 116 described with reference to FIG. 1. In such an embodiment, individual optical transmitters may be in direct communication with a multiplexer system, as shown in FIG. 11. Positioning optical transmitters that include light sources on the rotor 104 or stator 102 may also improve the performance of the system 100 by minimizing fiber coupling losses.

In various aspects and implementations, individual optical transmitters are configured to emit an optical data signal in a direction of an optical receiver of the first plurality of optical receivers. With reference to FIG. 1, the optical transmitters are configured to emit optical data signals in a direction of the rotor 104 through individual ones of the plurality of optical elements (i.e., transmitter 106*a* emits a data signal towards receiver 108*a*, transmitter 106*b* emits a signal towards receiver 108*b*, transmitter 106*c* emits a signal towards receiver 108*c*, etc.). Optical transmitters may transmit identical signals or individual segments of a divided data signal. In various embodiments data is transmitted as one or more data frames.

Individual optical receivers of the first plurality of optical receivers are configured to receive the optical data signals emitted by the optical transmitters. That is, each individual optical receiver is configured to receive an optical data signal from an optical transmitter (i.e., receiver 108*a* receives the signal from transmitter 106*a*, receiver 108*b* receives the signal from transmitter 106*b*, receiver 108*c* receives the signal from transmitter 106*c*, etc.). It is appreciated that as the rotor rotates, the each optical receiver will receive an optical data signal from the next successive optical transmitter in the direction of rotation. In various embodiments, each optical receiver of the first plurality of optical receivers may be an optical fiber end. As discussed above, optical fibers may improve performance of the system 100 by separating temperature sensitive components from high temperature locations. In particular, each optical receiver may be coupled to one or more detectors (e.g., photodetectors), such as the detector(s) 118 shown in FIG. 1. Turning briefly to FIG. 11, which shows a further schematic illustration of the optical system 100 illustrated in FIG. 1, in other embodiments, each optical receiver of the first plurality of optical receivers may be an individual detector, such as one of the detector(s) 118 described with reference to FIG. 1. In such an embodiment, individual optical receivers may be in direct communication with the multiplexer system. Positioning optical receivers including a detector on the rotor 104 or stator 102 may further improve the performance of the system by minimizing fiber coupling losses.

Returning to FIG. 1, in at least one embodiment, the system 100 includes a multiplexer system in communication with the first plurality of optical transmitters and the first plurality of optical receivers. This may include a multiplexer encoder 120 in communication with the first plurality of optical transmitters and a multiplexer decoder 121 in optical communication with the first plurality of optical receivers. In one embodiment, and as shown in FIG. 1, the multiplexer encoder 120 is coupled with the first plurality of optical transmitters via the light source(s) 116 and the multiplexer decoder 121 is coupled with the first plurality of optical receivers via the detector(s) 118. The multiplexer encoder 120 and multiplexer decoder 121 may be integral to the rotor electronics 142 or stator electronics 140, or external and in communication with the rotor electronics 142 or stator electronics 140. The multiplexer decoder 121 of various embodiments is configured to multiplex data from each optical receiver of the first plurality of optical receivers into a continuous digital data stream provided to an output device. The multiplexer system may include a digital multiplexer system that divides a data signal into multiple data segments, each segment sent to a particular light source to generate a corresponding optical data signal. Optical signals received by the optical receivers are converted back to digital segments of the data signal by the detector, and reassembled into the data signal by the digital multiplexer system. While in one embodiment, the multiplexer system includes a digital multiplexer system in various other implementations the multiplexer system may include an optical multiplexer system.

Figure 2:
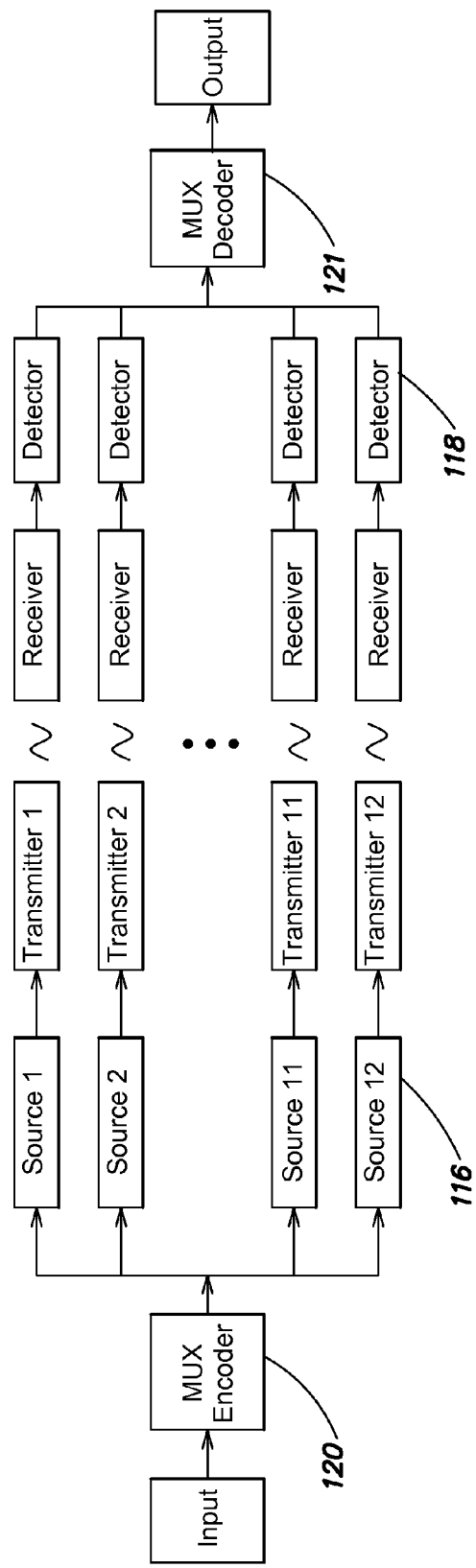
FIG. 2 is a block diagram illustrating one example of data transmission of the optical communication system of FIG. 1 according to at least one embodiment.

FIG. 2 illustrates one example of the multiplexer system coupled to the first plurality of optical transmitters and the first plurality of optical receivers, according to various embodiments. As shown, this may include a multiplexer encoder 120 coupled to the plurality of optical transmitters via the light source(s) 116, and a multiplexer decoder 121 coupled to the plurality of optical receivers via the detector(s) 118. In at least one embodiment, the transmit controller 136 provides an input data signal that is split by the multiplexer encoder 120 and communicated to the light source(s) 116. The light source(s) 116 generate an optical data signal corresponding to each segment of the split data signal received, and communicate optical data signals to an optical transmitter of the first plurality. Optical data signals transmitted by the optical transmitters are received by the optical receivers and provided to the detector(s) 118, which convert the received optical signal to a digital segment of the digital signal. The segments are sequentially selected and assembled as a continuous data stream by the multiplexer decoder 121. Data segments may be arranged, for example, according to individual header information that is embedded in a channel frame. Accordingly, parallel transmission of data segments according to various aspects and embodiments improves data transmission rates compared to conventional transmission methods. In various other embodiments, such as those described with reference to FIG. 11, the multiplexer encoder 120 may be directly coupled with the plurality of optical transmitters and the multiplexer decoder 121 may be directly coupled with the plurality of optical receivers. Such is the case when each transmitter of the plurality of optical transmitters includes a light source, and each optical receiver of the plurality of optical receivers includes a detector.

In several embodiments, individual ones of the first plurality of optical elements are interposed between optical transmitters of the first plurality of optical transmitters and optical receivers of the first plurality of optical receivers, and arranged so as to alternate between the first size and the second size. For example, FIG. 1 shows optical element 110*a* interposed between optical transmitter 106*a* and optical receiver 108*a*, optical element 112*a* interposed between optical transmitter 106*b* and optical receiver 108*b*, and optical element 110*b* interposed between optical transmitter 106*c* and optical receiver 108*c*. While shown as circumferentially disposed about the rotor 104, in other embodiments, the first plurality of optical elements may be circumferentially disposed about the stator 102. In various embodiments, the system 100 includes a plurality of optical elements corresponding in number to the number of optical transmitters and optical receivers (i.e., a one to one to one ratio). Each optical element of the first plurality of optical elements is constructed and arranged such that the optical data signal transmitted by an optical transmitter of the first plurality of optical transmitters passes through the optical element and is received by an optical receiver of the first plurality of optical receivers. Accordingly, the plurality of optical elements may include a plurality of collimating optics, and in particular, include a plurality of catadioptric Frensel lenses. The catadioptric Frensel lenses of one embodiment permit focusing and improved direction of received optical signals to the optical receivers. In further embodiments, a second plurality of collimating optics may be interposed between individual optical receivers of the first plurality of optical receivers and individual optical elements of the first plurality of optical elements.

In further embodiments, the optical system 100 includes a plurality of collimating optics interposed between individual optical transmitters of the first plurality of transmitters and individual optical elements of the first plurality of optical elements. Collimating optics may include, for example, collimating lenses 114 positioned to couple the optical data signal emitted by one of the first plurality of optical transmitters into an optical element. As shown in FIG. 1, the collimating optics of one embodiment may be circumferentially disposed about a surface of the stator 102; however, in various other embodiments, the collimating optics may also be circumferentially disposed about a surface of the rotor 104. In particular, it may be advantageous to dispose the collimating optics on the same surface of the rotor 104 or stator 102 at which the first plurality of optical transmitters is positioned. In various embodiments, the system 100 may include of collimating optics corresponding in number to the amount optical transmitters of the first plurality of optical transmitters (i.e., a one to one ratio).

In at least one embodiment, the system 100 includes a clock modulator 130 configured to generate a data clock encoded to rotational movement of the rotor 104, such as a speed of the rotor 104 relative to the stator 102. Similarly, the system 100 may include a clock data recovery (CDR) module 146 configured to recreate the generated data clock such that the transmitted data is synchronized on the rotor side and the stator side of the system 100. In such an embodiment, the clock modulator 130 and clock data recovery module 146 may be integral to the stator electronics 140 or rotor electronics 142, or in electrical communication with the stator electronics 140 or rotor electronics 142. For instance, the clock modulator 130 may be included in the transmit controller 136 and the clock data recovery module 146 may be included in the receive controller 138. Rotational movement of the rotor 104 relative to the stator 102 may be measured by one or more optical encoder 144. In such embodiments, the transmit controller 136 is configured to instruct the optical transmitters of the first plurality of optical transmitters to transmit data signals based on at least the data clock. In various embodiments the data clock controls the timing of optical transmitters, such as when an optical data signal is transmitted.

As the speed of the rotor 104 relative to the stator 102 decreases, each optical receiver of the plurality of optical receivers will be within view of an optical transmitter for a longer period of time. Similarly, when the speed of the rotor 104 increases, the timing of when an optical receiver will be within view of an optical transmitter will decrease. Accordingly, the speed of the rotor may be used by the transmit controller 136 to determine when a particular optical receiver will be within view of a particular transmitter. In such an embodiment, the transmit controller 136 may adjust the timing of a transmitted optical data signal based on the data clock such that the transmitted optical data signal aligns with a passing optical receiver. In several other embodiments, the transmit controller 136 may adjust a data transmission rate of the system 100, or individual optical transmitters within the system 100, relative to the speed of the rotor 104. For instance, the transmit controller 136 may increase a frame word length when the speed of the rotor 104 decreases, and decrease the frame word length when the speed of the rotor 104 increases. In various implementations, when the speed of the rotor 104 increases, a channel number may also be incremented to match the rotational speed of the rotor 104. Such an embodiment ensures that transmitters are communicating with successive receivers, and no receivers are skipped.

Referring to FIG. 3, there is illustrated a side view of the optical communication system 100 shown in FIG. 1, according to at least one example. Notably, the first plurality of optical receivers is obscured in FIG. 3 by the first plurality of optical elements. As shown, in various embodiments, the optical system 100 may further include a second plurality of optical transmitters (302a, 302b, 302c, . . . ) and a second plurality of optical receivers. The second plurality of optical receivers is similarly obscured from view by a second plurality of optical elements (304a and 304b). The second plurality of optical elements may include optical elements of a first size and a second size and arranged so as to alternate in size as described above with reference to the first plurality of optical elements of FIG. 1.

The second plurality of optical transmitters is shown circumferentially disposed at a fourth radius of the rotor 104. Accordingly, the second plurality of optical receivers is circumferentially disposed at a third radius of the stator 102. In various embodiments, the system 100 includes a corresponding number of optical transmitters, optical receivers, and optical elements (i.e., a one to one to one ratio). In various additional implementations, the second plurality of optical receivers may be circumferentially disposed at the fourth radius of the rotor 104, and the second plurality of optical transmitters may be circumferentially disposed at the third radius of the stator 102. As discussed above with reference to the first plurality of optical transmitters and first plurality of optical receivers, the second plurality of optical transmitters is shown circumferentially disposed at the fourth radius of the rotor 104, and the second plurality of optical receivers is shown circumferentially disposed at the third radius of the stator 102 for purposes of explanation only.

The fourth radius of the rotor 104 includes a distance from the rotation axis indicated by point 128, and may include any arbitrary distance. Similarly, the third radius of the stator 102 includes a third distance from the rotation axis, and may also include any arbitrary distance. Accordingly, in some embodiments the first radius and fourth radius are the same distance, and the second and third distance are the same distance. Alternatively, any of the first radius, second radius, third radius, and fourth radius, may be different from any other of the first, second, third, or fourth radius.

As shown in FIG. 1 with reference to the first plurality of optical transmitters and the first plurality of optical receivers, each individual optical transmitter of the second plurality of optical transmitters may be evenly spaced apart and each individual optical receiver of the second plurality of optical receivers may be evenly spaced apart. In various embodiments, the first plurality of optical transmitters, the first plurality of optical receivers, the second plurality of optical transmitters, and the second plurality of optical receivers are disposed about the rotor 104 or stator 102 as rings. For example, FIG. 3 shows the first plurality of optical transmitters and first plurality of optical receivers disposed circumferentially as a first ring, and the second plurality of optical transmitters and second plurality of optical receivers disposed as a second ring. Stacking one or more rings of optical transmitters and optical receivers permits an increase in transmission bandwidth and bi-directional communication across the interface between the rotor 104 and the stator 102.

Referring now to FIG. 4, there is illustrated a further side view of the optical communication system 100 shown in FIG. 1 according to at least a further example. Similar to the illustrated side view of FIG. 3, view of the first plurality of optical receivers is obscured in FIG. 4 by the first plurality of optical elements. As shown, the optical system 100 may further include a second plurality of optical transmitters (402a, 402b, 402c, . . . ) and a second plurality of optical receivers. The second plurality of optical receivers is also obscured from view by a second plurality of optical elements (404a and 404b). Each of the second plurality of optical receivers, second plurality of optical transmitters, and/or second plurality of optical elements may be similar to those discussed above with reference to FIG. 3.

As discussed with reference to FIG. 1, in various embodiments the optical communication system 100 may include an optical encoder in communication with components of the stator electronics 140, or rotor electronics, such as the transmit controller 136. The optical encoder 144 is positioned to detect rotational movement of the rotor 104 relative to the stator 102. As shown, this may include positioning the optical encoder 144 on the stator 102 to track movement of the rotor 104. However, in further embodiments, the optical encoder 144 may be positioned on the rotor 104. In various embodiments, the optical encoder 144 detects and converts the detected rotational movement of the rotor 102 into a signal. The signal may be received by other system components, such as the transmit controller 136, and further processed to determine information such as speed and position. For example, the transmit controller 136 may be configured to determine the position of dead space between each optical element of the first plurality of optical elements and each optical element of the second plurality of optical elements. The dead space is indicated in FIG. 4 generally by indicators 408. In one embodiment, the transmit controller 136 is configured to adjust a data transmission rate of the first plurality, or any further plurality, of optical transmitters based on such information. In further embodiments, the transmit controller 136 is configured to adjust a frame word length of the optical data signal transmitted by each optical transmitter based on such information. As discussed above, as the speed of the rotor 104 relative to the stator 102 decreases, each optical receiver of the plurality of optical receivers will be within view of an optical transmitter for a longer period of time. Accordingly, the frame word length of each frame transmitted may be increased. Similarly, when the speed of the rotor 104 increases, the timing of when an optical receiver will be within view of an optical transmitter will decrease. Accordingly, the frame word length of each frame transmitter may be decreased. In various implementations, when the speed of the rotor 104 increases, the channel numbers may also be incremented to match the rotational speed, such that optical data signals may be transmitted to the next sequential optical receiver.

Figure 5:
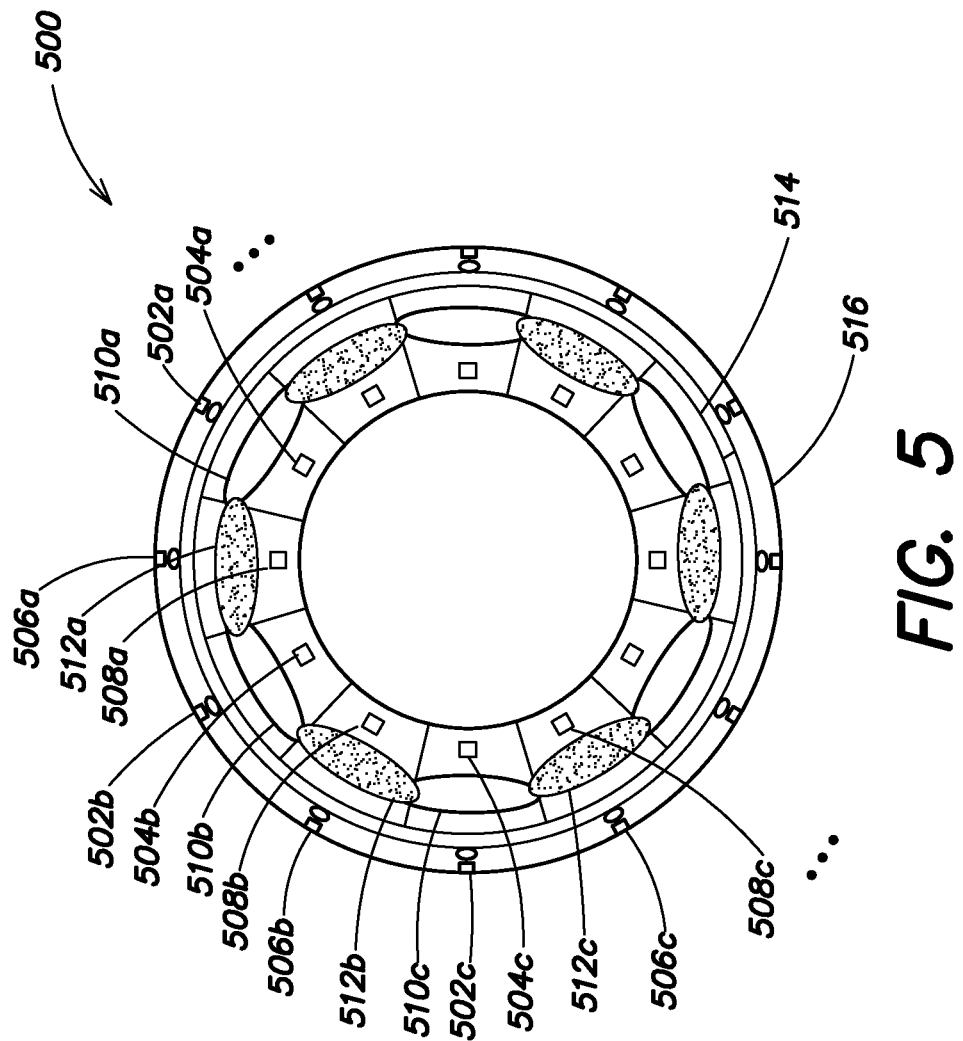
FIG. 5 is an illustration of another configuration of the optical communication system shown in FIG. 1 according to an example.
Figure 6:
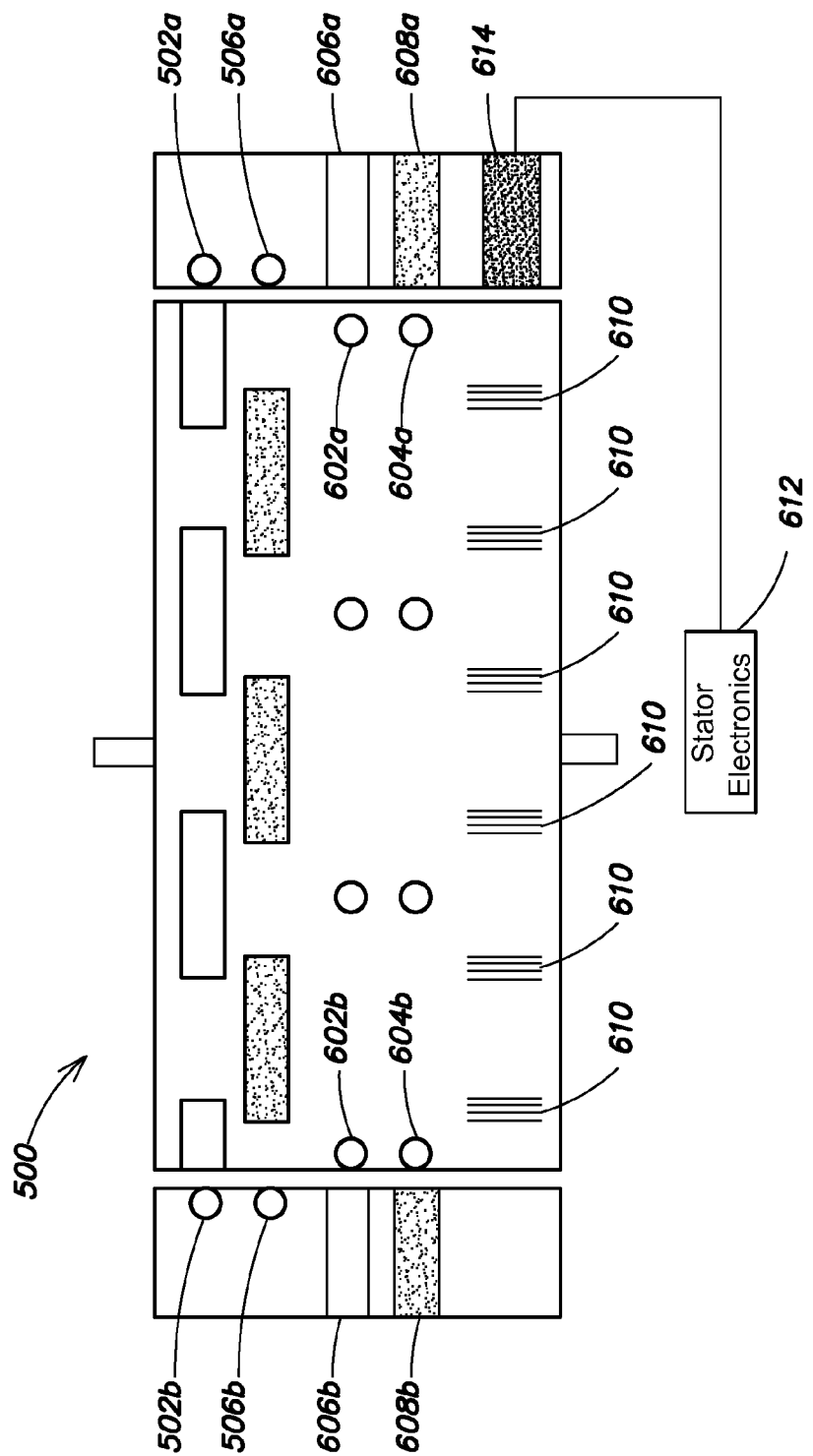
FIG. 6 is a side view of the optical communication system shown in FIG. 5 according to an example.

Referring to FIG. 5 there is illustrated another example of an optical communication system according to at least one embodiment. As shown, in various embodiments, the optical system 500 may include a first plurality of optical transmitters (502a, 502b, 502c, etc.), a first plurality of optical receivers (504a, 504b, 504c, etc.), a second plurality of optical transmitters (506a, 506b, 506c, etc.), a second plurality of optical receivers (508a, 508b, 508c, etc.), and additional pluralities of optical transmitters and receivers obscured from view in FIG. 5. FIG. 6 shows a side view of the optical system 500 of FIG. 5 including a third plurality of optical transmitters (602a, 602b, etc.), a third plurality of optical receivers, a fourth plurality of optical transmitters (604a, 604b, etc.), and a fourth plurality of optical receivers.

In various embodiments, any number of optical transmitter and optical receiver pluralities may be used. Further, each plurality of optical transmitters and receivers may include any number of optical transmitters and optical receivers. The optical transmitters and optical receivers shown in FIG. 5 and FIG. 6 may include optical transmitters and optical receivers similar to those discussed above with reference to FIG. 1.

As shown in FIG. 5, a first plurality of optical elements (510a, 510b, 510c, etc.) may be interposed between the first plurality of optical transmitters and receivers, and a second plurality of optical elements (512a, 512b, 512c, etc.) may be interposed between the second plurality of optical transmitters and optical receivers. Individual optical elements of the second plurality of optical elements may be disposed so as to overlap with an adjacently positioned optical element of the first plurality of optical elements. For example, optical element 512a is shown overlapping adjacent optical elements 510a and 510b. Overlapping elements may be positioned at different layers (e.g., depths) within the rotor. In particular, the second plurality of optical elements, the second plurality of optical transmitters, and the second plurality of optical receivers may be positioned at a second layer in one of the rotor 514 or stator 516. In one embodiment, optical elements of the first plurality of optical elements are all about the same size as optical elements of the second plurality of optical elements. In various embodiments, individual optical elements of the second plurality may be positioned to avoid any dead space between optical elements of the first plurality. The second plurality of optical elements and second plurality of optical receivers are shown disposed at gaps between individual optical elements of the first plurality of optical elements such that optical data signals transmitted by the second plurality of optical transmitters will be received by the second plurality of optical receivers when transmission between the first plurality of optical transmitters and first plurality of optical receivers is interrupted. This may provide the advantage of eliminating blackouts during data transmission and permitting redundancy in data transmission. While a single layer configuration may be advantageous when space is limited, a multi-layer configuration may substantially improve data throughput.

Figure 12:
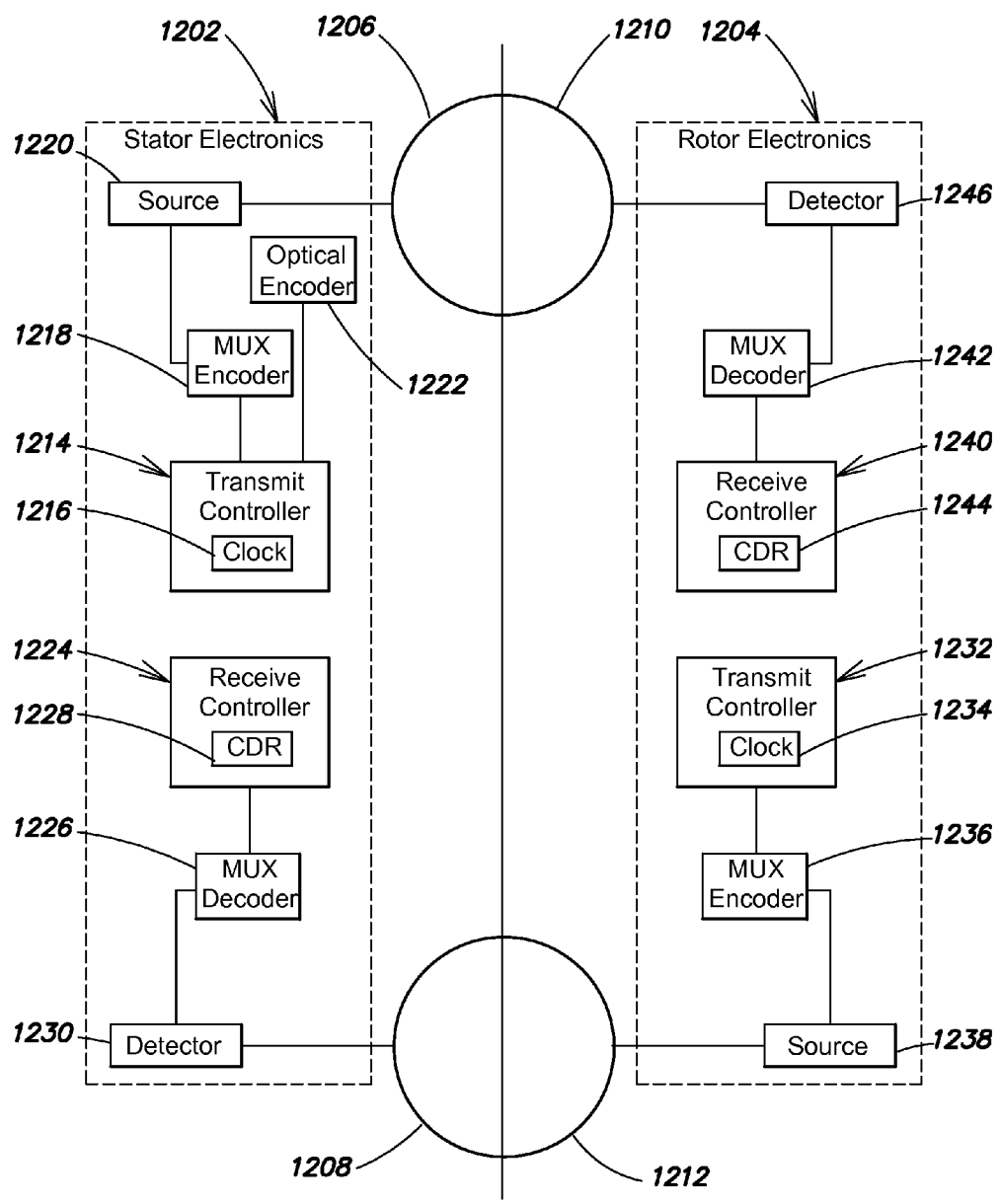
FIG. 12 is an illustration of stator electronics and rotor electronics according to at least one example.

In various embodiments, multi-layer configurations may be used to transmit and receive data at both the rotor 514 and the stator 516 simultaneously. That is, in various embodiments, the rotor 514 may include a plurality of optical transmitters and a plurality of optical receivers, and the stator may include a plurality of optical transmitters and a plurality of optical receivers. In such an embodiment, rotor electronics may include both a transmit controller and a receive controller, and the stator electronics may include both a transmit controller and a receive controller. For instance, transmit controllers and receive controllers may include those discussed above with reference to FIG. 1. FIG. 12 shows an illustration of stator electronics and rotor electronics associated with an optical system for bi-directional transmission.

In such an embodiment, the stator electronics 1202 may include a first transmit controller 1214, a first clock modulator 1216, a first multiplexer encoder 1218, a first one or more optical source(s) 1220, an optical encoder 1222, a first receive controller 1224, a first multiplexer decoder 1226, a first clock data recovery module 1228, and a first one or more detector(s) 1230. Such components may be coupled to optical transmitters and receivers located at one or more layers of the stator. Semi-circles 1206 and 1208 represent a first and second layer of a stator of one embodiment, respectively.

Similarly, the rotor electronics 1204 may include a second transmit controller 1232, a second clock modulator 1234, a second multiplexer encoder 1236, a second one or more optical source(s) 1238, a second receive controller 1240, a second multiplexer decoder 1242, a second clock data recovery module 1244, and a second one or more detector(s) 1246. Such components may be coupled to optical transmitters and receivers located at one or more layers of the rotor. Semi-circles 1210 and 1212 represent a first and second layer of a rotor of one embodiment, respectively. Components of the rotor electronics 1204 and stator electronics 1202 shown in FIG. 12 may include components similar to those discussed above with reference to stator electronics 140 and rotor electronics 142 of FIG. 1.

Turning now to FIG. 6, a third plurality of optical elements (606*a*, 606*b*, etc.) may be interposed between the third plurality of optical transmitters and receivers, and a fourth plurality of optical elements (608*a*, 608*b*, etc.) may be interposed between the fourth plurality of optical receivers and optical transmitters. FIG. 6 shows the first plurality of optical elements positioned at a first layer, the second plurality of optical elements positioned at the second layer, the third plurality of optical elements positioned at a third layer, and the fourth plurality of optical elements positioned at a fourth layer. Individual optical elements of the third and fourth plurality may be of about the same size. As shown, optical elements of the fourth plurality of optical elements are arranged so as to permit communication between the fourth plurality of optical transmitters and fourth plurality of optical receivers during blackout positions of the third plurality of optical transmitters and receivers. Dead spaces between optical elements are illustrated in FIG. 6 by indicators 610. Also shown in FIG. 6, various embodiments may include one or more optical encoders in communication with one or more components of stator electronics or rotor electronics, such as a transmit controller of the stator electronics 612 shown. The one or more optical encoders 614 may include the optical encoder discussed above in FIG. 4, and the stator electronics 612 may include the stator electronics 140 discussed above with reference to FIGS. 1 and 4.

Figure 7A:
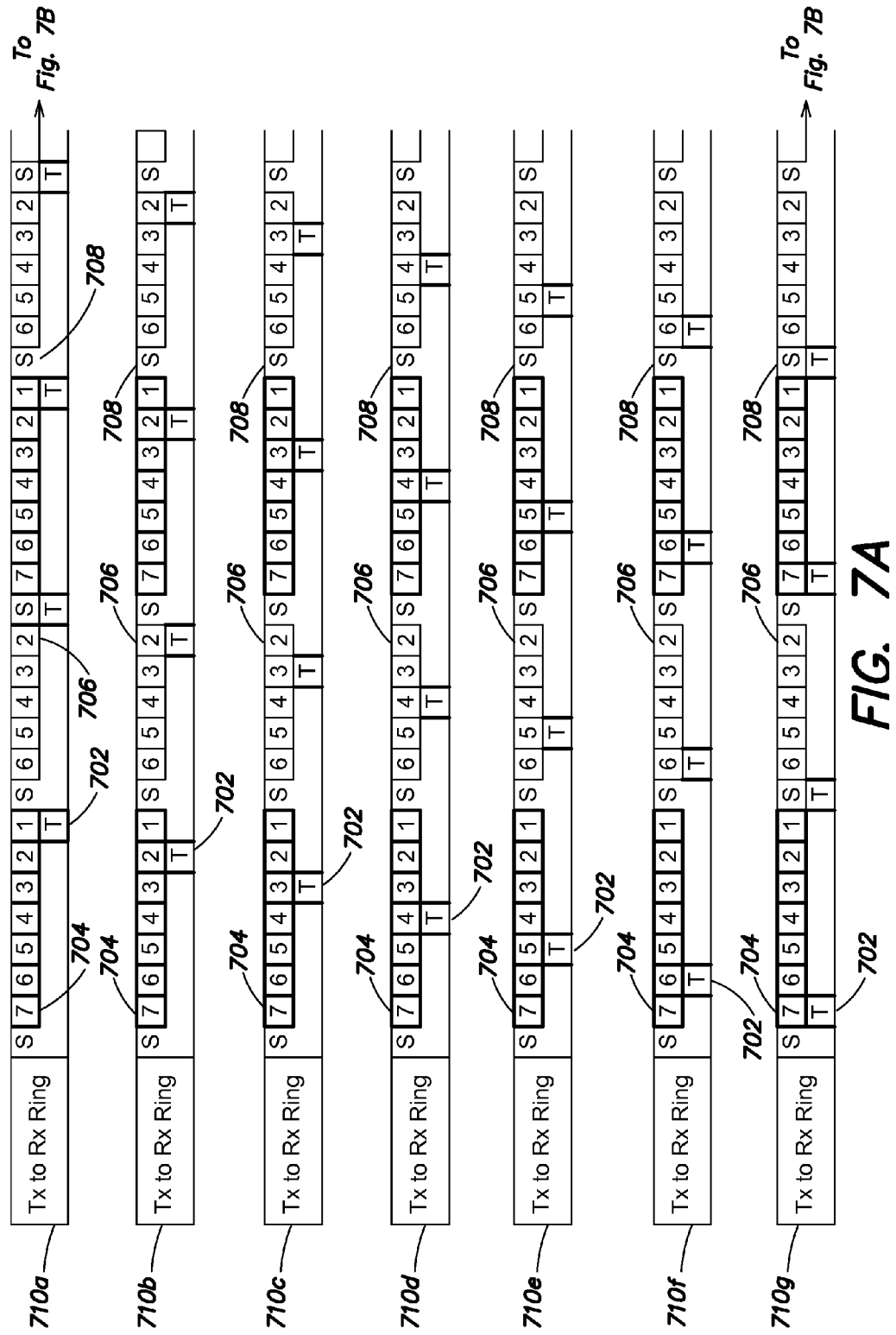
Figure 7B:
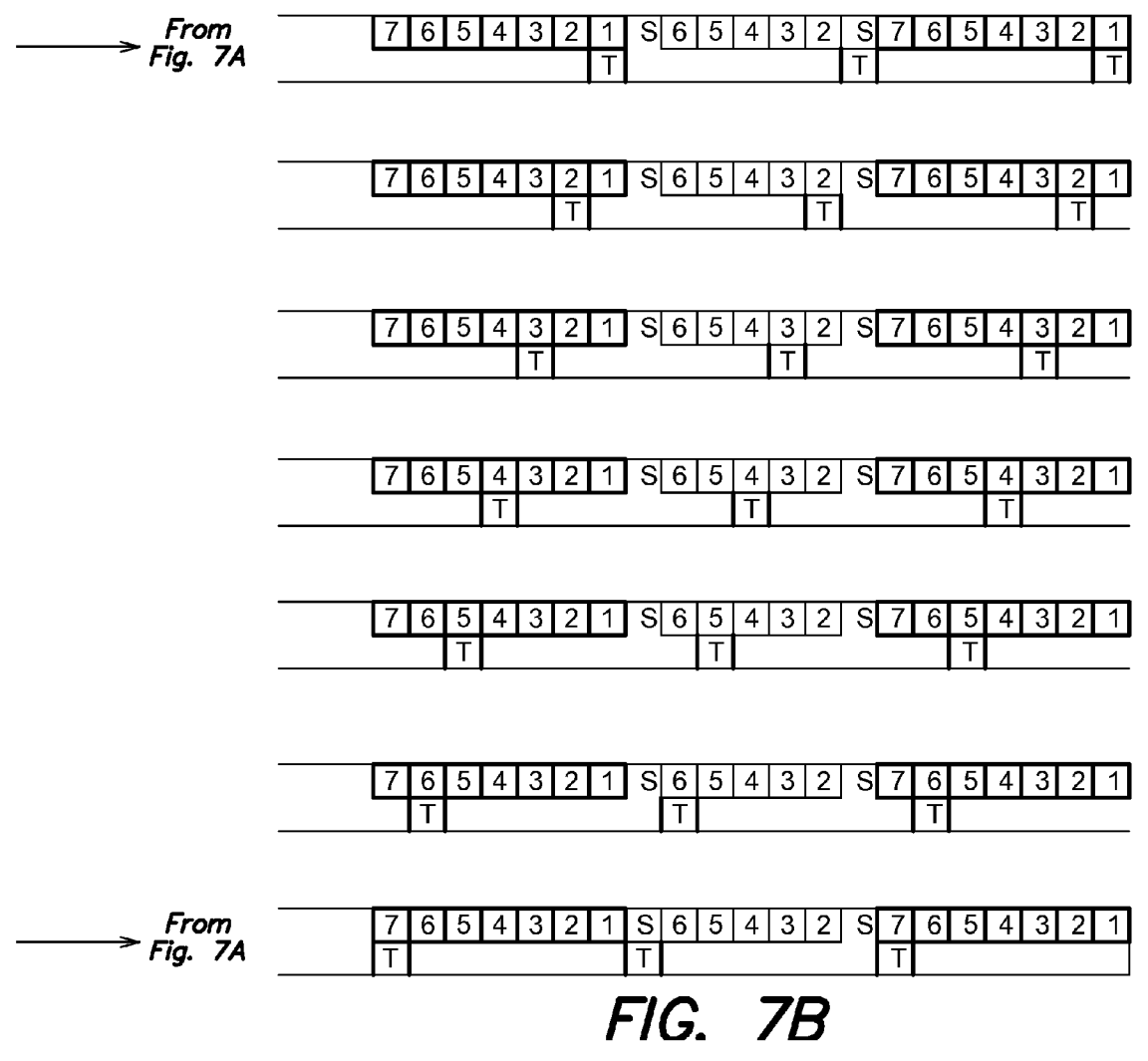

Referring to FIGS. 7A and 7B, provided is one example illustration of data transmission timing according to aspects and embodiments. FIGS. 7A and 7B are described with continuing reference to FIG. 1. While discussed with reference to a single plurality of optical transmitters and a single plurality of optical receivers (e.g., the first plurality of optical transmitters and first plurality of optical receivers of FIG. 1), in various embodiments further sets of optical transmitters and receivers operate in a similar fashion.

As discussed above, aspects and embodiments provide uninterrupted data transmission through a rotary joint. Such aspects and embodiments eliminate blackout periods and avoid data latency as the rotary joint moves. In the illustration of FIGS. 7A and 7B, blocks 702 represent individual optical transmitters of the plurality of optical transmitters (also indicated by the character "T"), blocks 704 represent data frames transmitted through an optical element of a first size, blocks 706 represent data frames transmitted through an optical element of a second size, and blocks 708 represent data frames transmitted through a dead space (also indicated by the character "S"). Dead spaces may occur at multiple positions during data transmission, as shown in FIGS. 7A and 7B. Each set 710*a*-710*g*, represents a moment in time during travel of the rotor relative to the stator of one embodiment. Accordingly, movement from the first set 710*a*, to the second set 710*b*, to the third set 710*c*, and etc., represents transmission during rotation of the optical joint. While shown as including seven optical transmitters 702, seven transmitter frames 704 per optical transmitter of the first size, and five transmitter frames 706 per optical transmitter of the second size, in various implementations any number of optical transmitters 702 may be used, and the number of transmitted frames may largely depend on the operational parameters (e.g., position and speed of the rotary joint).

As shown, during rotation of the rotor relative to the stator, transmission through alternating sizes of optical elements eliminates blackout periods in data transmission. At each set, at least one optical transmitter is aligned with an optical element, whether of a first or a second size, and therefore successfully transmits the optical data signal through that optical element to a corresponding optical receiver. While signals will not be received when an optical transmitter is aligned with a dead space between optical elements (i.e., block 708), only a few optical transmitters will be aligned with a dead space at any given time. Further, at some positions, for example set 710*c*, each individual optical transmitter of the plurality will be aligned with an optical element, and therefore transmit optical data signals in parallel. Thus, various aspects and embodiments also offer higher data transmission rates compared to known communication techniques.

In various aspects and implementations, communication between optical transmitters and optical receivers at a frequency of 1 Ghz or 10 Ghz allows multiple frames of transmission per optical transmitter and receiver pair, as shown in FIGS. 7A and 7B. A frame includes unit of data transmission having an ordinality and cardinality of words. Each word is a piece of data handled as a unit and includes a number of bits of a predetermined length. For example, words may have a length of 8, 16, 24, 32, or 64 bits. Frames in accordance with various aspects and embodiments are further discussed below with reference to FIG. 8.

With continuing reference to FIGS. 7A and 7B, in one embodiment each word may include 16 bits, and each frame may have 2048 words per frame. At a frequency of 1 Ghz the corresponding bit time would be 0.001 μsec. Accordingly, the word time would be 0.016 μsec, and the frame time would be 32.768 μsec. At an example rpm of 500 (the max rpm for a helicopter), the number of frames per revolution at 1 Ghz would be 3662.11, and the number of frames per revolution at 10 Ghz would be 36621.1. For a system including twelve optical transmitters and twelve optical receivers, this would result in transmission of 305 frames at a frequency of 1 Ghz per receiver pair, or 3052 frames at a frequency of 10 Ghz per receiver pair. Thus, in various embodiments the frame word length may be based or adjusted relative to rotational movement, such as speed, of the rotary joint. Such features permit optimization of data transmission for time-varying operational conditions.

Figure 8:
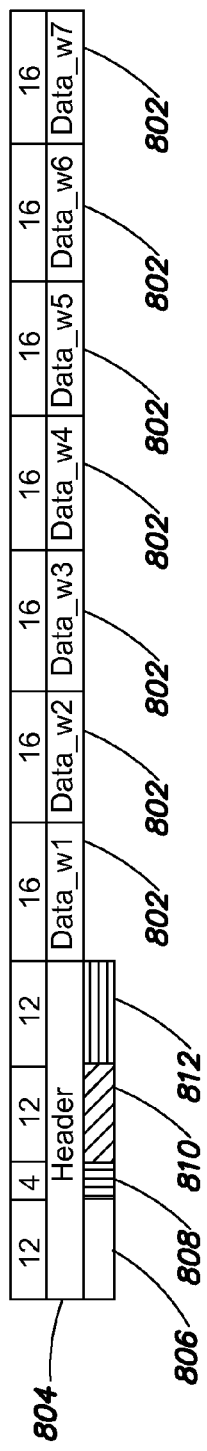
FIG. 8 is an illustration of a data frame according to an example.

Turning now to FIG. 8, shown is one example of a data frame according to various embodiments. In particular, FIG. 8 shows an example of a data frame having a frame word length of seven, although other word lengths may be employed. As discussed above, each data frame includes a plurality of words 802 having cardinality and an ordinality relative to other words. FIG. 8 shows each word 802 as having 16 bits. Each data frame further includes a header 804 having a sync word 806, a channel number 808, a frame number 810, and a word length 812. The shown sync word 806 includes 12 bits, the channel number 808 includes 4 bits, the frame number 810 includes 12 bits, and the word length 812 includes 12 bits. The sync word 806 is a character, sequence, or other preamble, used to synchronize transmission of the optical data signal by indicating the beginning of the data and the end of the header 804 for the frame. The channel number 808 includes an identification of the particular receiver that the frame is intended to be received at. Also included in the header 804, the frame number 810 indicates the position of the transmitted data frame relative to other data frames transmitted to the receiving optical receiver in the optical data signal. The frame word length 812 indicates the number of words in the data frame. In various embodiments the word length 812 is relative to the size of the particular optical element through which the optical data signal is transmitted. For example, the frame word length 812 may be a first frame word length when transmitted through an optical element of a first size, and a second frame word length when transmitted through an optical element of a second size. Accordingly, when transmitted through optical elements of a alternating sizes (e.g., first size, second size, first size, second size, etc.), the frame word length 812 may alternate between the first word length and the second word length. One example of such an implementation is shown in FIG. 9.

Figure 9:
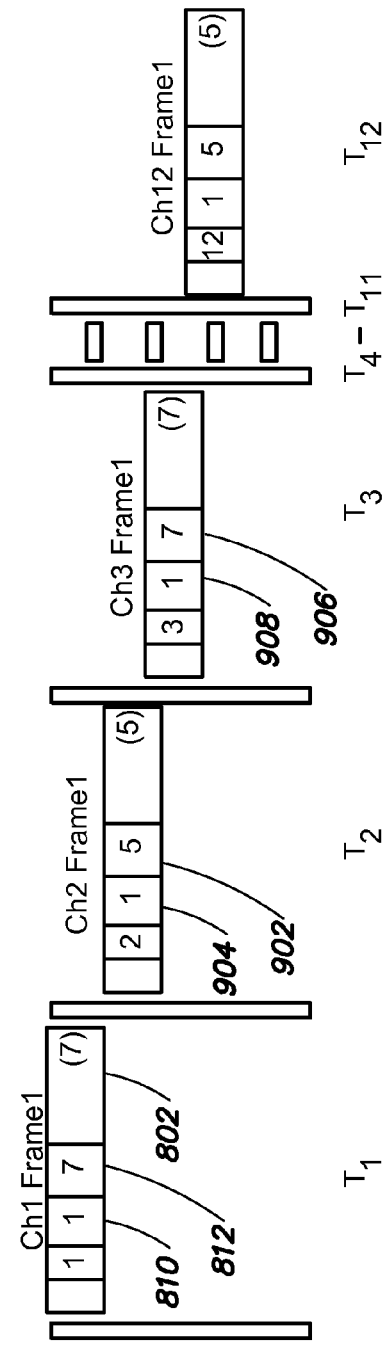
FIG. 9 is an illustration of data transmission according to an example.
Figure 10:
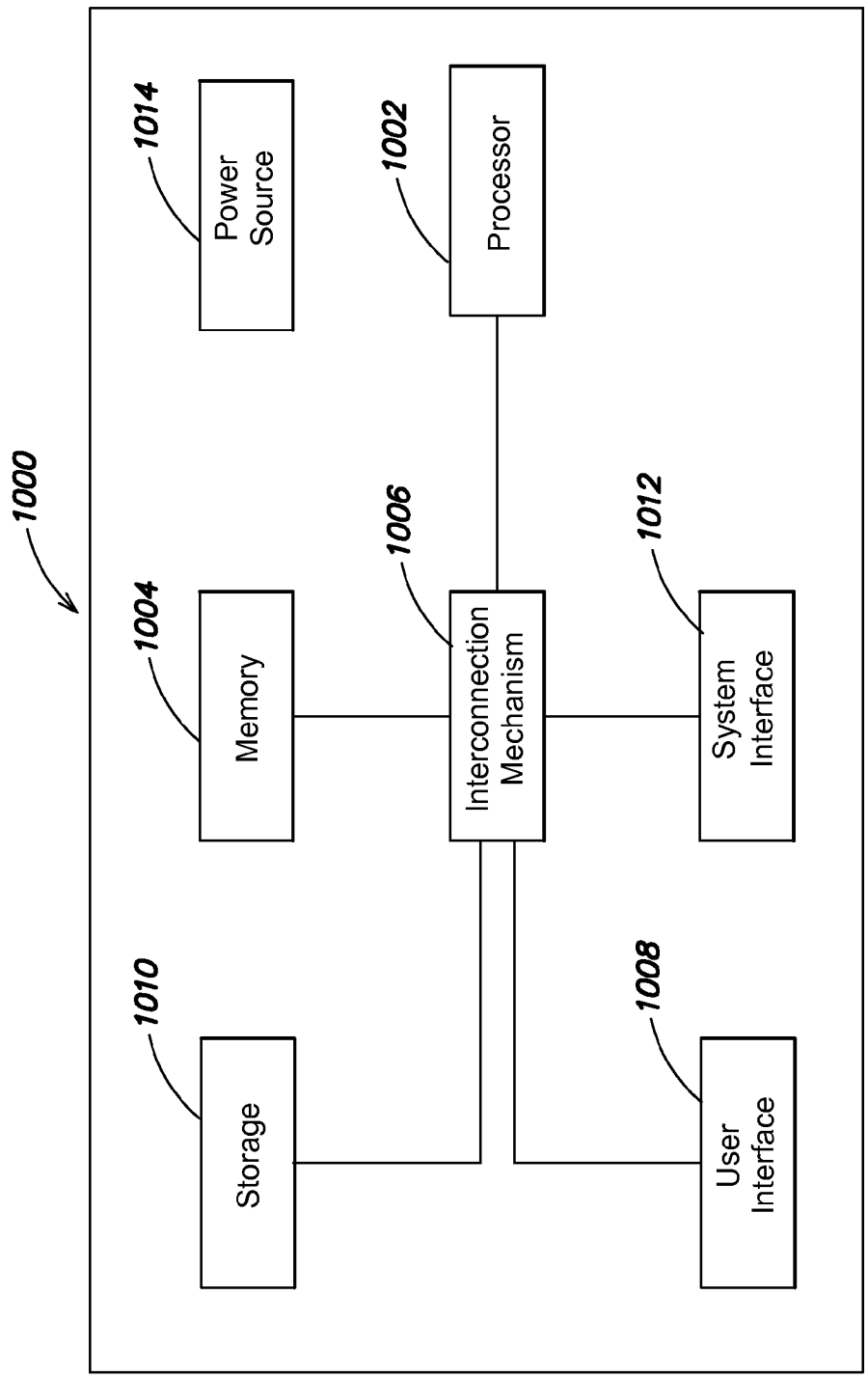
FIG. 10 is an illustration of a controller according to an example.

Turning to FIG. 9, one illustration of optical data signal transmission according to an embodiment is shown. FIG. 9 is described with continuing reference to FIG. 1 and FIG. 8. While FIG. 10 shows transmission of a single data frame from a single optical transmitter per each respective channel, as discussed above, various data frames may be received by a particular optical receiver from any number of optical transmitters. During a first time interval, $T_1$, the optical transmitter communicates the first data frame to a first optical receiver (i.e., channel 1). The data frame has a word length 812 of seven, and a frame number 810 of one, indicating that this is the first frame transmitted from transmitter and sent to the receiver. At a second time interval, $T_2$, subsequent to rotation of the rotor relative to the stator, the optical transmitter communicates a second data frame to a second optical receiver (i.e., channel 2). The data frame has a word length 902 of five, and a frame number 904 of 1, indicating that this is the first frame transmitted from the transmitter and communicated to the second receiver. At a third time interval, $T_3$, subsequent to further rotation of the rotor relative to the stator, the optical transmitter communicates a third data frame to a third optical receiver (i.e., channel 3). The data frame has a word length 906 of seven, and a frame number 908 of 1, indicating that this is the first frame transmitted from the transmitter and communicated to the third receiver. Notably, the frame length of each successive frame alternates as the rotor rotates relative to the stator. Similar processes occur as the rotor continues to rotate until the optical transmitter is aligned with a final optical receiver (shown in FIG. 9 as a $12^{th}$ channel). In an embodiment wherein one frame is transmitted to each optical receiver during rotation, the frame number may also be incremented based on any successive rotations of the rotor relative to the stator. For example, the frame number for each frame transmitted during a second rotation may increase from one to two, the frame number for each frame transmitted during a third rotation may increase from two to three, and frame number for each frame transmitted during a fourth rotation may increase from three to four, and etc.

Referring to FIG. 10, there is illustrated a block diagram of an example controller, in which various aspects and functions are practiced. In various embodiments, the controller 1000 may include controllers of the stator electronics 140 and/or rotor electronics 142 shown in FIG. 1 and discussed above. For instance, this may include the transmit controller 136 and the receive controller 138. As shown, the controller 1000 can include one or more system components that exchange information and perform various functions such as adjusting a data transmission rate of one or more optical transmitters, adjusting a frame word length of a data signal transmitted by one or more optical transmitters, or controlling a multiplexer or clock modulator, for example. More specifically, the controller 1000 can include at least one processor 1002, a power source 1014, a data storage 1010, a user interface 1008, a system interface 1012, a memory 1004, and one or more interconnection mechanisms 1006. The at least one processor 1002 may be any type of processor or multiprocessor. The at least one processor 1002 is connected to the other system components, including one or more memory devices 1004 by the interconnection mechanism 1006. In various embodiments, the controller 1000 can further include any appropriate signal processing circuitry, such as circuitry configured to execute signal conditioning and electronic control and feedback.

The memory 1004 stores programs (e.g., sequences of instructions coded to be executable by the processor 1002) and data during operation of the controller 1000. Thus, the memory 1004 may be a relatively high performance, volatile, random access memory such as a dynamic random access memory ("DRAM") or static memory ("SRAM"). However, the memory 1004 may include any device for storing data, such as a disk drive or other nonvolatile storage device. Various examples may organize the memory 1004 into particularized and, in some cases, unique structures to perform the functions disclosed herein. These data structures may be sized and organized to store values for particular data and types of data.

Components of the controller 1000 are coupled by an interconnection mechanism such as the interconnection mechanism 1006. The interconnection mechanism 1006 may include any communication coupling between system components such as one or more physical busses in conformance with specialized or standard computing bus technologies. The interconnection mechanism 1006 enables communications, including instructions and data, to be exchanged between system components of the controller 1000.

The controller 1000 can also include one or more user interface devices 1008 and system interface devices 1012 such as input devices, output devices and combination input/output devices. Interface devices may receive input or provide output. More particularly, output devices may render information for external presentation. Input devices may accept information from external sources. Examples of user interface devices include keyboards, mouse devices, trackballs, microphones, touch screens, printing devices, display screens, speakers, network interface cards, etc. Interface devices allow the controller to exchange information and to communicate with external entities, such as users and other systems.

The data storage element 1010 includes a computer readable and writeable data storage medium configured to store noon-transitory instructions and other data, and can include both nonvolatile storage media, such as optical or magnetic disk, ROM or flash memory, as well as volatile memory, such as RAM. The instructions may include executable programs or other code that can be executed by the at least one processor 1002 to perform any of the functions described here below. Although not illustrated in FIG. 10, the controller 1000 may include additional components and/or interfaces, such as a communication network interface (wired and/or wireless), and the at least one processor 1002 may include a power saving processor arrangement.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A communication system comprising:
   a stator;
   a rotor concentric to the stator, the rotor being configured to concentrically rotate relative to the stator;
   a first plurality of optical receivers circumferentially disposed at a first radius of one of the stator and the rotor;
   a first plurality of optical transmitters circumferentially disposed at a second radius of the other of the stator and the rotor, each optical transmitter of the first plurality of optical transmitters configured to transmit a data signal to a corresponding optical receiver of the first plurality of optical receivers, wherein each optical receiver of the first plurality of optical receivers is configured to receive the data signals from each successively passing optical transmitter of the first plurality of optical transmitters during rotation of the rotor; and
   a first plurality of collimating optics, individual collimating optics of the first plurality of collimating optics having one of at least a first size and a second size, wherein the individual collimating optics are interposed between each optical transmitter of the first plurality of optical transmitters and each optical receiver of the first plurality of optical receivers and arranged so as to alternate between at least the first size and the second size circumferentially along one of the rotor and the stator.

2. The communication system of claim 1, wherein the plurality of collimating optics includes a plurality of catadioptric Frensel lenses.

3. The communication system of claim 1, wherein each collimating optic of the first plurality of collimating optics is positioned so as to overlap with an adjacently positioned collimating optic.

4. The communication system of claim 1, further comprising:
   a second plurality of optical receivers circumferentially disposed at a third radius of one of the stator and the rotor; and
   a second plurality of optical transmitters circumferentially disposed at a fourth radius of the other of the stator and the rotor, each optical transmitter of the second plurality configured to transmit a data signal to a corresponding optical receiver of the second plurality of optical receivers.

5. The communication system of claim 4, further comprising a second plurality of collimating optics, individual collimating optics of the second plurality of collimating optics having one of at least the first size and the second size, wherein the individual collimating optics of the second plurality of collimating optics are interposed between each optical transmitter of the second plurality of optical transmitters and each optical receiver of the second plurality of optical receivers and arranged so as to alternate between at least the first size and the second size circumferentially along one of the rotor and the stator.

6. The communication system of claim 4, wherein the first radius is of the rotor, the second radius is of the stator, the third radius is of the stator, and the fourth radius is of the rotor.

7. The communication system of claim 1, further comprising a multiplexer decoder in communication with the first plurality of optical receivers and configured to multiplex the data signals from each optical receiver into a continuous stream.

8. The communication system of claim 1, further comprising a clock modulator configured to generate a data clock encoded to a rotational speed of the rotor, wherein the first plurality of optical transmitters are configured to transmit the data signals based on at least the data clock.

9. The communication system of claim 1, further comprising an optical encoder in communication with a transmit controller, wherein the optical encoder is positioned to detect the rotation of the rotor, and wherein the transmit controller is configured to adjust a data transmission rate of the first plurality of optical transmitters based on the detected rotation.

10. The communication system of claim 9, wherein the transmit controller is further configured to adjust a frame word length of the data signal transmitted by each optical transmitter of the first plurality of optical transmitters.

11. The communication system of claim 1, further comprising a plurality of collimating lenses, individual collimating lenses interposed between optical transmitters of the first plurality of optical transmitters and collimating optics of the first plurality of collimating optics.

12. A communication system comprising:
    a stator;
    a rotor concentric to the stator;
    a first plurality of optical receivers circumferentially disposed at a first radius of one of the stator and the rotor;
    a first plurality of optical transmitters circumferentially disposed at a second radius of the other of the stator and the rotor, each optical transmitter of the first plurality configured to transmit data to a corresponding optical receiver of the first plurality of optical receivers; and
    means for providing uninterrupted data transmission between optical transmitters of the first plurality of optical transmitters and optical receivers of the first plurality of optical receivers.

13. The communication system of claim 12, further comprising:
    a second plurality of optical receivers circumferentially disposed at a third radius of one of the stator and the rotor; and
    a second plurality of optical transmitters circumferentially disposed at a fourth radius of the other of the stator and the rotor, each optical transmitter of the second plurality configured to transmit data to a corresponding optical receiver of the second plurality of optical receivers.

14. The communication system of claim 13, further comprising means for providing uninterrupted data transmission between optical transmitters of the second plurality of optical transmitters and optical receivers of the second plurality of optical receivers.

15. The communication system of claim 12, further comprising a multiplexer decoder in communication with the first plurality of optical receivers and configured to multiplex the data signals from each optical receiver into a continuous stream.

16. The communication system of claim 12, further comprising a clock modulator configured to generate a data clock encoded to a rotational speed of the rotor, wherein the first plurality of optical transmitters are configured to transmit the data signals based on at least the data clock.

17. The communication system of claim 12, further comprising an optical encoder in communication with a transmit controller, wherein the optical encoder is positioned to detect rotational movement of the rotor and the transmit controller is configured to adjust a data transmission rate of the first plurality of optical transmitters based on the detected rotational movement.

18. The communication system of claim 17, wherein the transmit controller is further configured to adjust a frame word length of the data signal transmitted by each optical transmitter of the first plurality of optical transmitters.

19. A communication system comprising:
a stator;
a rotor concentric to the stator;
a plurality of optical receivers circumferentially disposed at a first radius of one of the stator and the rotor;
a plurality of optical transmitters circumferentially disposed at a second radius of the other of the stator and the rotor, each optical transmitter of the plurality of optical transmitters configured to transmit a data signal to a corresponding optical receiver of the plurality of optical receivers; and
a plurality of collimating optics, individual collimating optics of the plurality of collimating optics having one of at least a first size and a second size, wherein the individual collimating optics are interposed between each optical transmitter of the plurality of optical transmitters and each optical receiver of the plurality of optical receivers and arranged so as to alternate between at least the first size and the second size circumferentially along one of the rotor and the stator, and wherein each collimating optic of the plurality of collimating optics is positioned so as to overlap with an adjacently positioned collimating optic.

* * * * *